United States Patent [19]

Shu

[11] Patent Number: 5,596,660
[45] Date of Patent: Jan. 21, 1997

[54] COMPRESSION/REDUCTION METHOD FOR EXTRACTING ICONIC/SYMBOIC INFORMATION FROM AN IMAGE ARRAY

[75] Inventor: David B. Shu, Canoga Park, Calif.

[73] Assignee: Hughes Aircraft Company, Los Angeles, Calif.

[21] Appl. No.: 599,545

[22] Filed: Feb. 17, 1995

Related U.S. Application Data

[63] Continuation of Ser. No. 99,302, Jul. 28, 1993, abandoned.

[51] Int. Cl.$^6$ ............................................. G06K 9/36
[52] U.S. Cl. ................................ 382/302; 382/232
[58] Field of Search ........................... 382/302, 232, 382/240, 276, 205, 206; 395/129, 130, 132

[56] References Cited

U.S. PATENT DOCUMENTS

| | | | |
|---|---|---|---|
| 4,809,346 | 2/1989 | Shu | 382/27 |
| 4,809,347 | 2/1989 | Nash et al. | 382/49 |
| 4,901,360 | 2/1990 | Shu et al. | 382/41 |
| 4,908,751 | 3/1990 | Smith | 382/49 |
| 5,038,386 | 8/1991 | Li | 382/49 |
| 5,253,308 | 10/1993 | Johnson | 382/49 |

Primary Examiner—Joseph Mancuso
Assistant Examiner—Gerard Del Rosso
Attorney, Agent, or Firm—V. D. Duraiswamy; W. K. Denson-Low

[57] ABSTRACT

A method of compressing symbolic information stored in a two dimensional matrix of processing elements each containing a binary pixel representing an object mask and an associated multiple-bit valued pixel carrying information related to the object at each of the binary pixels and representative of objects embedded therein. A gated connection network of Processing Elements is formed for each object in the array by comparing the value of the binary pixels stored in each Processing Element with the value of the binary pixels stored in its neighboring Processing elements and closing the gates between Processing Elements that contain the same pixel value and opening the gates between Processing Elements that contain different pixel values. The method sequentially partitions the array matrix into regions and determines, for each gated connection network of Processing Elements in each region, which Processing Elements are at a regional local coordinate minimum and maximum of the array matrix, and assigns a unique source and destination label, respectively, to those Processing Elements. The contents of the multiple-bit valued pixels associated with the binary pixel assigned the source label are combined in a preselected manner with the contents of the multiple-bit valued pixels associated with the binary pixel assigned the destination label. The binary pixel assigned the source label is deleted after combining from any further minimum or maximum coordinate determination.

6 Claims, 4 Drawing Sheets

COMPRESSION/REDUCTION METHOD FOR EXTRACTING ICONIC/SYMBOIC INFORMATION FROM AN IMAGE ARRAY

This invention was made with Government support under Contract No. F30602-90-C-0054 awarded by the Department of the Air Force. The Government has certain rights in this invention.

This is a continuation application Ser. No. 08/099,302 filed Jul. 28, 1993, now abandoned.

CROSS REFERENCE TO RELATED U.S. PATENTS

This application is related to the following U.S. Patents: U.S. Pat. No. 4,809,346 issued Feb. 28, 1989 entitled "Computer Vision Architecture for Iconic to Symbolic Transformation"; U.S. Pat. No. 4,809,347 issued Feb. 28, 1989 entitled "Computer Vision Architecture"; and, U.S. Pat. No. 4,901,360 issued Feb. 13, 1990 entitled "Gated Architecture for Computer Vision Machine," all of which are assigned to Hughes Aircraft Company, the assignee of the present invention.

BACKGROUND OF THE INVENTION

1. Field of the Invention

This invention relates in general to computer vision or image understanding machines and, more particularly, to computer architectures and methods capable of both arithmetic or iconic and symbolic processing of image data.

2. Description of the Related Art

There exists a need for a computer system that is capable of both arithmetic or iconic and symbolic processing of image data which is designed specifically for use in computer vision research and analyses efforts. Such a system can be used in a variety of different applications such as for use in real time processing of data from radar, infrared and visible sensors in areas such as aircraft navigation and reconnaissance. Another application of such a machine would be as a development system for use in vision laboratories in the implementation and simulation of many computationally intensive algorithms.

Machines which are capable of operating on image data (as compared to merely arithmetic data) are referred to alternatively as image processors, vision computers, image understanding machines and the like. Image understanding machines are sometimes thought of as a higher level machine than an image processor which is typically referred to as a machine for enhancing and classifying images, whereas an image understanding machine involves the automatic transformation of the image to symbolic form, effectively providing a high level description of the image in terms of objects (i.e., a connected set of pixels containing information), their attributes, and their relationship to other objects in the image. The present invention is directed to this latter type of machine (although it can do the lower level tasks as well) which shall be referred to as an image understanding machine.

It is generally recognized that a high level image understanding machine must be capable of performing two basic types of computations: arithmetic or iconic processing and symbolic manipulation. Thus, it would be desirable to provide an image understanding machine that is capable of performing a number of visual information processing algorithms.

It should be noted that future algorithmic developments will be a continually and rapidly evolving activity resulting from changing applications, advances in sensor and solid state technologies, and the need for added intelligence to deal even more rapidly and effectively with ever increasing amounts of raw data.

Many of the known concurrent or parallel processing computer architectures are not specifically intended to be used for image understanding purposes. Other image processing systems also suffer from the inability to efficiently perform both numeric and symbolic computations. For example, some of the prior architectures do not lend themselves to efficiently execute various artificial intelligence techniques such as frames, rules and evidential reasoning, while at the same time being capable of efficiently doing more iconic related image processing algorithms. One of the major drawbacks in the prior computer architectures was that their designs generally necessitated the transfer of large amounts of data between a host computer and the special purpose vision computer, and, in parallel processing environments using a plurality of processing levels, between a lower and a higher processing level of processing elements.

Unfortunately, the transfer of data and instructions in the known architectures resulted in relatively slow operational speed. It is, of course, one of the ultimate objectives in any computer system to increase the speed of operation without unduly increasing costs or complexity of operation.

As noted above and by way of background, architecture for an image understanding machine is disclosed herein in the aforementioned U.S. Patents for performing both iconic and symbolic operations on image data in the form of a matrix of pixels. Such machines include a first level of image processing elements for operating on the image matrix on a pixel per processing element basis. Each processing element of the first level is adapted to communicate with each other. A second level of processing elements is provided for operating on a plurality of pixels associated with a given array of the processing elements of the first level. Each second level processing element is associated with a group of first level processing elements and communicates therewith as well as with other second level processing elements. A third level of processing elements is provided for performing such functions as instructing the first and second level of processing elements. It is also designed to operate on a larger segment of the matrix than the second level processing elements. Each third level processing element is associated with a given number of second level processing elements and communicates therewith as well as with other third level processing elements. A host computer communicating with at least each third level processing element is provided for performing such functions as instructing the third level processing elements.

This computer architecture is designed to solve the problem of the disparities in granularity from iconic processing to symbolic processing. By the term "granularity" it is meant that the processing power of each processing element at a given level is comparable to the area (i.e., grain size) of the image segment associated with it. The larger the grain size the more powerful the processing element becomes.

This architecture in general provides an efficient implementation match at each level of granularity. Thus, for iconic processing which requires the smallest granularity, a processor per pixel approach is provided (i.e., the first level processing elements) to efficiently perform these tasks. On the other hand, for higher level or more sophisticated operations, the third level processing elements are provided which can be implemented in the form of general purpose microprocessors.

The computer architecture provides parallelism at substantially all levels of computation. Thus, bottlenecks which are often associated with serial computations or communications are avoided.

Computation of the moments of an object is difficult because it involves a large number of potential pixels, which are configured in irregular patterns. Most parallel computers can do the calculations internal to the summation steps simultaneously in parallel O(1) time. However, the summation process then requires that the data values be collected from over the object area, which is a more difficult process and cannot be done in O(1) time. The summation on parallel mesh machines usually involves accumulation of data values using shifting operations to bring data together, an O(L×N) operation for L times N pieces of data.

The existing technique requires the higher level processing elements to scan through all of the two-dimensional array of data to extract the symbolic information from the lower level processing elements.

Assuming that there are M objects in an L by N image, in a parallel architecture as described herein, all objects in the image can be processed in parallel. The scan time for this operation is proportional to the image size and is therefore very large for even moderate sized image planes, i.e., it takes O(L×N) (i.e., L times N) time to scan the results and to detect the M objects in the image by the higher level processing elements. However, since the time to extract the symbolic information is proportional to the number of objects in the image, this number is very small compared to the image size. Since only the M objects are of interest, it is a disadvantage that the higher level processing elements have to step over the non-object containing areas to locate the objects embedded in the iconic data.

The disadvantage of the prior art to compute the moments of an object in an image is that the summation on parallel mesh machines usually involves accumulation of data values using shifting operations to bring data together, an O(L×N) operation, where L and N are the dimensions of the object area in pixels, independent of the number of objects in the image and the shape of the object. For the worst case, L×N could be the size of the image.

SUMMARY OF THE INVENTION

The approach of the present invention also provides an effective means of communication back and forth between signal processing activities and the symbolic activities. The interconnection system of the machine of this invention connects different levels of processing elements in such a way as to match the characteristics of most computer vision problems and the manner in which they are solved by way of implementing the various algorithms. In addition, the architecture provides a modular, reliable and relatively low cost approach.

Among the advantages and characteristics of this architecture include: hardware to match problem granularity, parallel operation throughout the problem, high efficiency for symbolic operation, the capability to perform both low-level (iconic) and high-level (symbolic) processing, a high degree of parallelism in system hierarchy, a highly testable structure of identical elements, optimal locality of operation—data essentially remains in place, minimal demands on global data bus bandwidth, and identical processing elements of relatively simple design.

The machine of the present invention is an architectural approach and method that provides an efficient mechanism to compress sparsely populated iconic/symbolic image data into a dense form by extracting object moments via a reduction operation. The method described here is unique in that it utilizes the gated connection network structure of the image understanding machine architecture described above and in U.S. Pat. No. 4,809,346 to compute the object moments via a reduction operation in $O(\log_2 L \times N)$ steps where L×N is the dimension of the object area in pixels, independent of the number of objects in the image area and the shape of the object in the image area.

The present $O(\log_2 L \times N)$ method and architecture described herein is based on being able to rapidly set up "source/destination" addresses in object processing elements (PE) using a gated connection network to communicate data therebetween. This invention allows a computing platform running under Single Instruction Multiple Data Stream (SIMD) architecture to reconfigure a topology that mirrors the method of the present invention by using the data-dependent switch setting of the gated connection network architecture found in the image understanding machine described above.

The $O(\log_2 L \times N)$ method of the present invention has very little overhead because it makes use of the gated connection network of image understanding machine architectures which is a switched strategy. When the dimension L×N of an image area is large, the use of the present method results in a significant performance increase for the entire machine and process.

Once the present method has been applied to a first level array of processing elements representing binary pixels and having associated therewith their associated multiple, or even single bit valued data, e.g., grey scale pixel data, to compress the object data contained therein, the symbolic image data can be quickly located in the processing elements of one level by the next level of processing elements for higher level processing based on pointers to the compressed object image data instead of by sequentially scanning all of the processing elements of the lower level.

However, by using the gated connection network found in the image understanding machine described above, "long distance" communications between processing elements in one level of an array are not impeded by the limitation to nearest neighbor information exchange.

This invention provides a method for a machine, such as an image understanding machine, to enable it to compress the symbolic data in an image and, once the data is so compressed, skip the very slow scanning operation and ·therefore speed up the overall process of accessing and extracting symbolic information from the iconic image information held by a lower level of processing elements.

Generally, the present invention is found in a method of analyzing two dimensional data, e.g, an image, represented by a matrix of binary pixels and associated multiple or single-bit valued data, such as grey scale pixels, where the binary pixels represent an object mask and the multiple-bit valued pixels associated therewith carry information related to the object at each of the binary pixels, to extract symbolic information from the single or multiple-bit valued pixels representative of objects embedded therein, and includes loading the binary pixels into a machine, such as an image understanding machine having at least one level of Processing Elements forming an array matrix such that each binary pixel is stored in a memory in one Processing Element. A gated connection network of Processing Elements for each object in the array is then formed by comparing the value of the binary pixels stored in each Processing Element with the value of the binary pixels stored in its neighboring Processing elements and closing the gates between Processing Elements that contain the same pixel value and opening the gates between Processing Elements that contain different pixel values. The gated connection network may be formed either physically or logically in the architecture embodying the present invention.

The array matrix is then sequentially divided into regions and determining for each gated connection network of Processing Elements in each of the regions, wich Processing Element is at a coordinate minimum of the array matrix in that region and assigning a unique source label to said Processing Element.

Likewise, determining for each gated connection network of Processing Elements in each of the regions, which Processing Element is at a coordinate maximum of the array matrix in that region and assigning a unique destination label to said Processing Element.

The contents of the single or multiple-bit valued pixels associated with the binary pixel assigned the source label are then transferred and combined in a preselected manner with the contents of the single or multiple-bit valued pixels associated with the binary pixel assigned the destination label.

The binary pixel assigned the source label is removed from any further minimum or maximum coordinate determination once its contents have been transferred.

The process is complete when no further transferral between different minimum and maximum coordinates is noted. This is determined by continuing to divide the array into a plurality of regions of increasing size with an obvious maximum limit being when the regions equal the image size. One preferable method of choosing the plurality of regions is to increase the size of the regions for each division of the array matrix by an integer power, such as a power of two, over the prior region in one dimension of the array.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DETAILED DESCRIPTION OF THE INVENTION

This invention is an improvement of the "Computer Vision Architecture for Iconic to Symbolic Transformation" U.S. Pat. No. 4,809,346 referenced above. This patent specified an architectural implementation of an algorithm to assign in parallel an unique symbol/label to every object (i.e., connected set of pixels) found in an image using a coordinate system defined for the Processing Element Array and corresponding image data. The label is equal to the minimum pixel coordinate in the object in the image array. This label is called the min-label or the "source". Similarly, a label called the max-label or "destination" will signify the maximum pixel coordinate in the object in the image array. The min-label and the max-label form the basis for the present invention to be able to rapidly set up, at each reduction step, "source" addresses (i e., min-labels) and "destination" addresses (i.e., max-labels) in object pixels.

To perform moment analysis, at a given step in the $O(\log_2 L \times N)$ steps accumulation method of the present invention, this invention allows the reduction process to proceed based on the "source/destination" addresses in object binary pixels using a gated connection network to communicate data therebetween.

The following description is focused on the issue of the general parallel reduction method for multiple two-dimensional image objects in the present invention. An example application of the reduction method is the accumulation step in the moments analysis, specifically parallel summation of all the pixel's data values associated with a given object for all objects in the image data, since this is a critical process step. Other applications of the present invention would include the analysis or reduction of other two or even multidimensional data representative of such events as seismic activity, fluid flow or sonar data, as only a few non-limiting examples.

Figure 1:
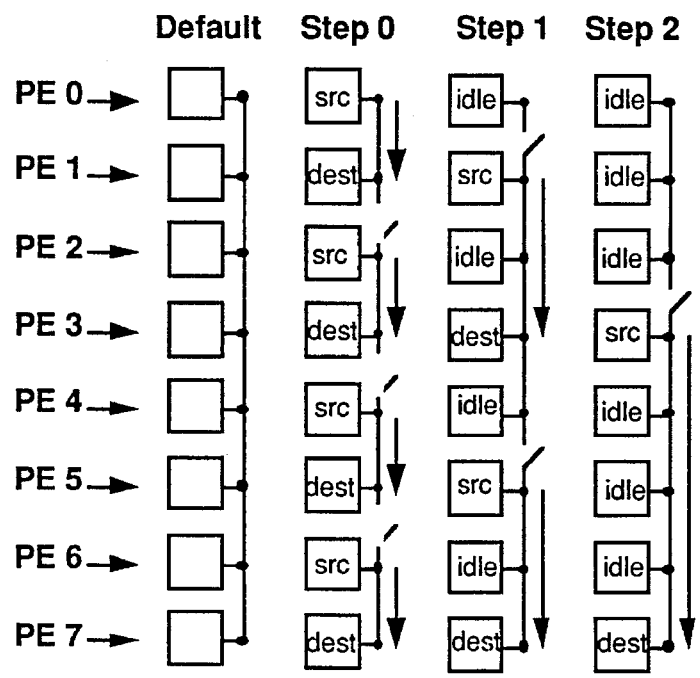
FIG. 1 is a block diagram illustrating the extraction of two symbols from processing elements in a 8×1 array.
Figure 2:
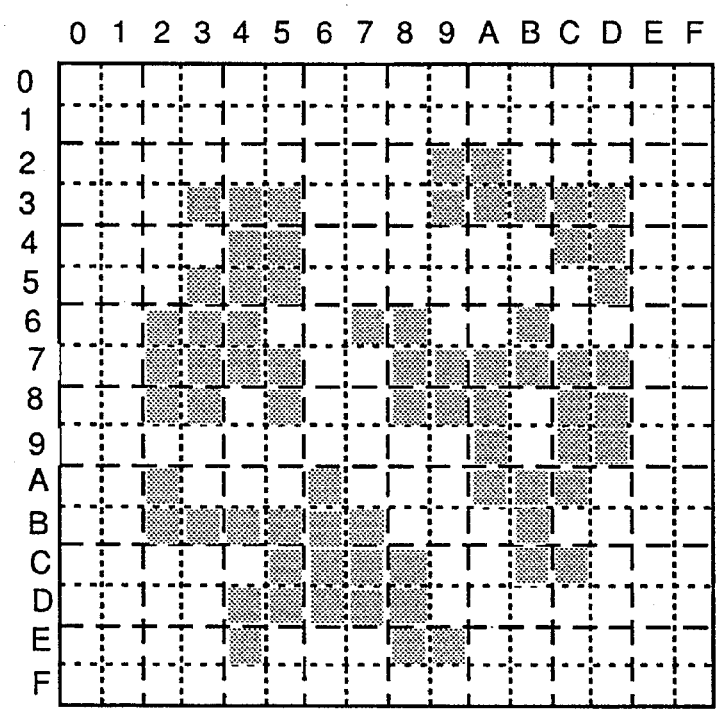
FIG. 2 is a diagram illustrating a number of objects embedded a plane image of iconic data.

An example of a binary adder tree created using a gated connection network architecture to add data is shown in FIG. 1. Here, the addition of eight values proceeds in three reduction steps ($\log_2 8$). At each step, there is a source Processing Element called "src" and a destination Processing Element called "dest". A combining function specifies how collisions are handled, i.e., how to reduce a "source" operand and a "destination" operand into a single value when two contrary operands are colliding. The combine function can be "+", "−","*" or any of the other binary functions. In this particular moment analysis, the combine function chosen for the example is a "+" (add) operation. The combine function always consumes two operands and generates one result value. Therefore, there always will be progress at each step and the overall process will be finite. The binary adder tree strategy shown in FIG. 1 is appropriate for one dimensional accumulations, i.e., 1×N, but is not extendable to two dimensional irregularly shaped objects, such as shown in FIG. 2 unless there is a priori knowledge of the largest object size and the accumulation operation is performed over a fixed geometry. This, however, is not normally the situation.

At each reduction step, the identity of the "source/destination" Processing Element pairs is not obvious. The present invention makes this choice clear to the reduction process by assigning the "source" to the Processing Element having the "min-label" mentioned before, and the "destination" to the Processing Element having the "max-label."

The present invention makes use of the speed with which consensus functions such as min/max can be calculated as described in U.S. Pat. No. 4,809,346.

The basic strategy is to actually calculate the address of "source" and "destination" Processing Elements associated with an object by finding the minimum and maximum pixel coordinates of Processing Elements within that object.

To better understand the method of the present invention, a simple example may illustrate how the parallel reductions for multiple two dimensional data or image objects are processed. Let us assume two dimensional data or an image represented by a matrix of binary and associated single or multiple-bit valued or grey scale pixels where the binary pixels represent an object mask and the multiple-bit valued or grey scale pixels associated therewith carry information related to the object at each of the binary pixels. Refer to FIG. 2 which contains four irregular objects, one of which even has a "hole" inside it. Each square in this array corresponds to a processing element and each of the darker squares corresponds to a processing element that has been activated because it is part of an object as represented by a binary object mask.

Create a gated connection network (GCN) of processing elements for each object (i.e., an object GCN), in the array by comparing the value of the binary pixels stored in each processing element with the value of the binary pixels stored in its neighboring processing element and closing the gates between processing elements that contain the same pixel value and opening the gates between processing elements that contain different pixels values.

The method of the present invention is to sequentially divide the array matrix into regions where each sequential division of the matrix is into regions of increasing size (preferably the size increase is an integer power such as a power of two over the prior region in one dimension of the array). For example, using a power of two size increase, in the first sequential step the processing element array matrix is broken into 2×1 regions as represented by the ovals shown in FIG. 3. For the sake of clarity, only ovals in top row and left columns are shown.

The object GCN is modified in each of these regions and consists of either a two Processing Element gated connection network, a single Processing Element gated connection network (i.e., containing only a single pixel value in the set or region), or no gated connection network (i.e., no object pixels in the set or region).

Next, the minimum and maximum values of concatenated Processing Element addresses are found using the algorithm described in U.S. Pat. No. 4,809,346 for each of these regions or any of the other available min/max methods for computing the values.

Figure 3:
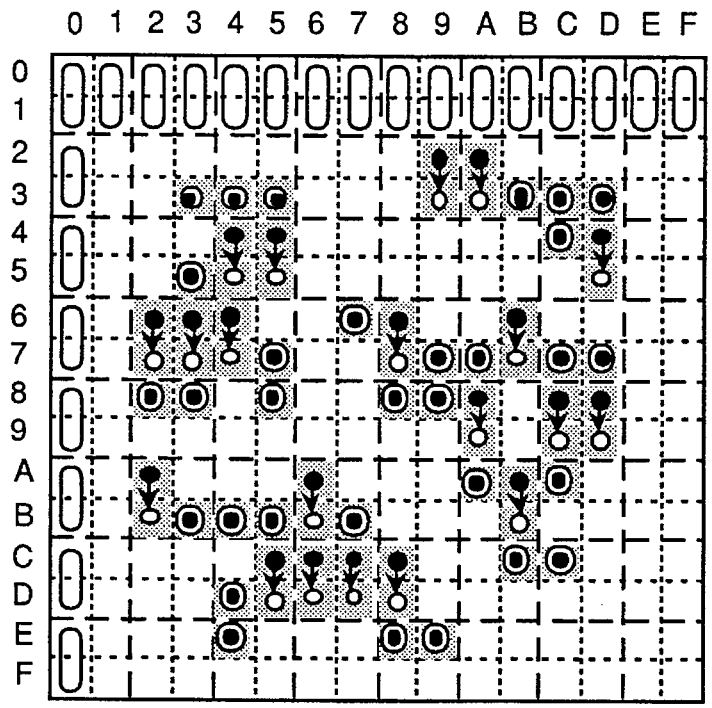
FIG. 3 illustrates the reduction operation taking place in a 2×1 set of reduction regions.

The "source" Processing Elements and the "destination" Processing Elements, the "dots" and "open circles" in the Figure respectively, in each region, can then communicate with one another via the gated connection network connecting them. As shown in FIG. 3, the curved arrows pointing from dots to open circles illustrate the direction of movements of data values. Single Processing Element gated connection networks have identical "source" and "destination" addresses, i.e., the circles with dots inside in the Figures and therefore remain static.

The first summation is performed by having "source" Processing Elements send data values held in its associated grey scale pixels to the respective grey scale pixels associated with the binary pixels at each of the "destination" Processing Elements within its region or set as shown by the arrows in the Figures. The "source" Processing Element is then removed from any further min/max determination. A single Processing Element gated connection network does nothing, as it is both the "source" and "destination" for its data.

Figure 4:
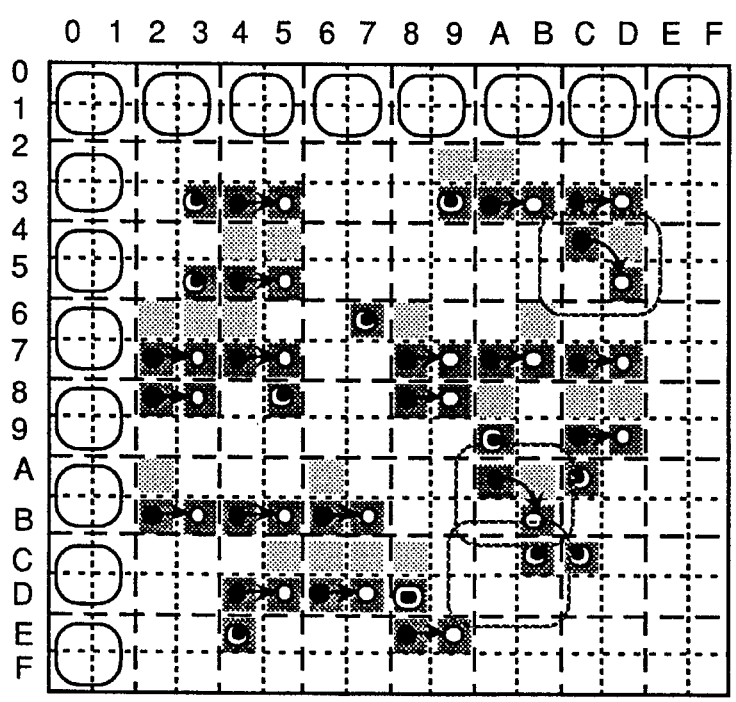
FIG. 4 illustrates the reduction operation taking place in a 2×2 set of reduction regions.

In the second part of the first step, the entire Processing Element array matrix is broken into 2×2 Processing Element sets or regions as partially shown in FIG. 4 by the circles encompassing now four cells of the matrix. For the sake of clarity, only circles in the top row and the left column are shown. Some of the circles shown inside are enlarged to illustrate the arrow pointed curves from dots or sources to open circles or destinations.

In this step, the same gated connection network strategy as described above is used, but the area of each set or region covered is twice as large as previous. Here the "source" and "destination" Processing Elements are indicated by the dark dots and circles, while the remaining Processing Elements that are part of the gated connection network are highlighted in grey.

After calculation of the "source" and "destination" processing elements as stated above, the data is transferred again between respective single or multiple-bit valued data, or grey scale pixels, the "source" Processing Elements removed, and the next summation takes place.

Note that for some geometries, i.e., the areas circled in FIG. 4, the "source-to-destination" transfer involves a corner Processing Element of the 2×2 set or region. Again as previously noted in the first summation step, some Processing Elements are both the source and destination addresses for their own data and consequently do nothing.

Figure 5:
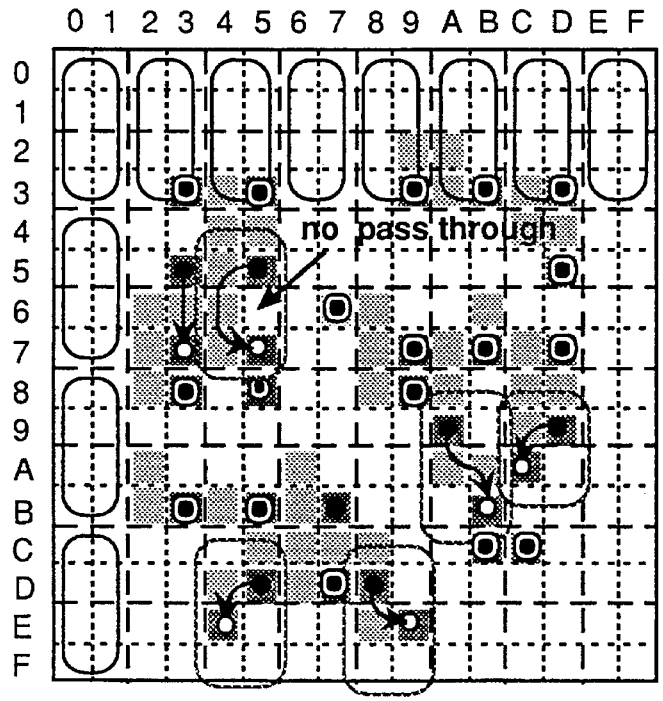
FIG. 5 illustrates the reduction operation taking place in a 4×2 set of reduction regions.
Figure 6:
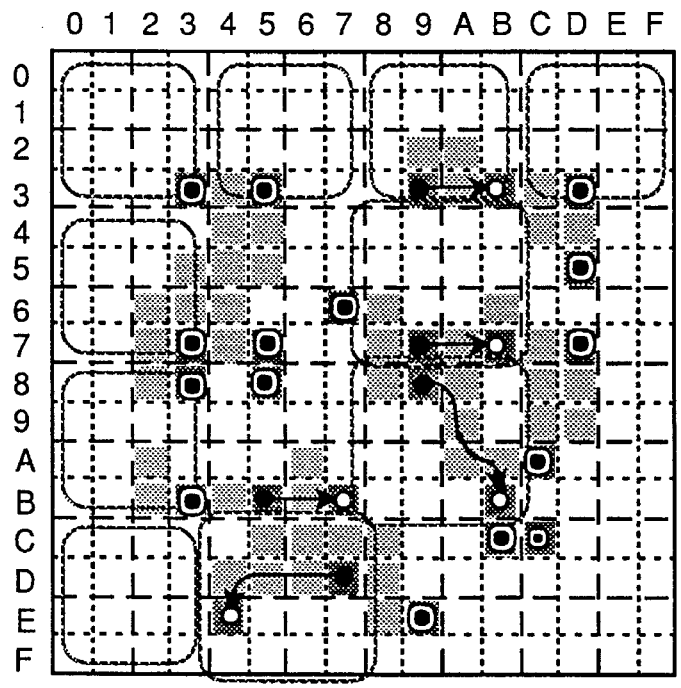
FIG. 6 illustrates the reduction operation taking place in a 4×4 set of reduction regions.

The second step continues this summation operation with the creation of 4×2 and then 4×4 sets or regions as shown in FIG. 5 and 6 respectively, where all the same terminology applies.

Note that in FIG. 5 and in 6, there are data transfers between a "source" address and a "destination" address that are not directly connected by an active Processing Element through the gated connection network. This is illustrated by the arrows passing from a blackened circle or "dot" to an open circle through gray or lighter colored cells in the matrix. These lighter colored cells are cells that have already participated in the max/min calculations in previous divisions of the array into regions, and have been removed from further max/min determinations for subsequent division of the matrix into regions as part of the compression process. For example, in FIG. 5, the arrow pointed curve detours to the left via some non-active processing elements because there is a hole as indicated by the "no pass through" sign.

Figure 7:
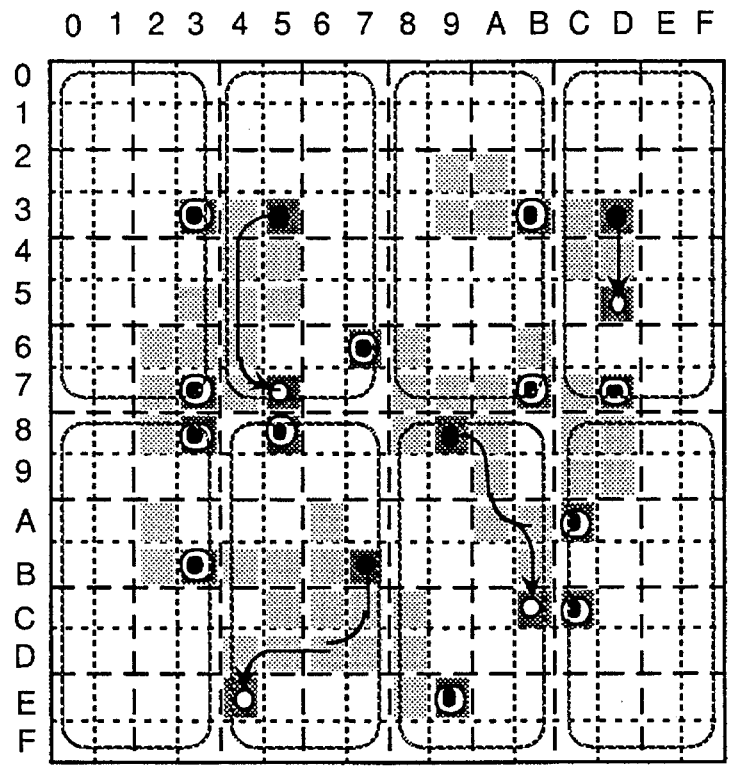
FIG. 7 illustrates the reduction operation taking place in a 8×4 set of reduction regions; and, FIG. 8 illustrates the reduction operation taking place in a 8×8 set of reduction regions.
Figure 8:
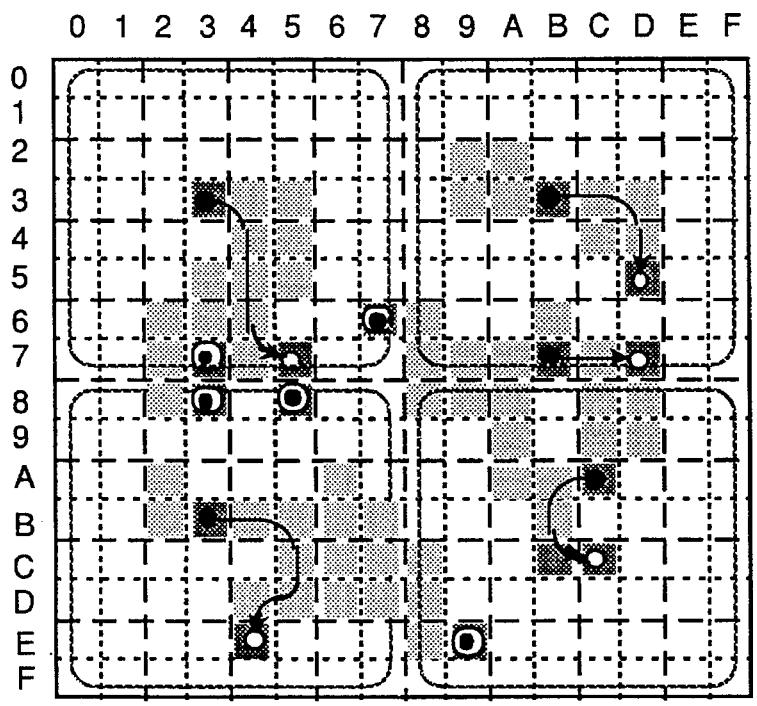

The final step, illustrated in FIG. 7 and 8, completes the accumulation of data values with creation of 8×4 and 8×8 sets or regions for summation.

For larger sized objects the set or region sizes would continue to increase until there was no activity detected in any region of the array, which would mean that the accumulation operation was completed. This increase in region size would in all instances stop when the region size grew to the size of the image array. However, in this example, the size of the regions for each division of the array matrix was increased by a power of two over the prior region in one dimension of the array. With this selection of region size, the set or region sizes grow exponentially, and the overall calculation for the entire array matrix proceeds in $O(\log_2 L \times N)$ time. Likewise, it is necessary that the sequence of regions chosen be such that each sequential region in the sequence be at least the same area as the immediately preceding region in the sequence although it need not be a monotonically increasing size increase in area.

The reason that the method of the invention is so efficient compared to the movement of the data itself and associated computations, is that the calculation of "source" and "destination" addresses can be done extremely efficiently in this dynamic way for each of the steps. Once the various "source" and "destination" addresses have been calculated for all steps, as might be done for the first intensity summation in moment calculations, they are then saved for later reuse during the other moment accumulations. Thus, higher order moments can be calculated using gated connection network mask set values that were determined during the zero$^{th}$order moment calculation.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. A method of analyzing a two dimensional grouping of data represented by a matrix of binary mask pixels and associated object pixels where the binary mask pixels represent an object mask and the object pixels associated therewith carry information related to the object at each of the binary mask pixels, to extract symbolic information from the object pixels representative of objects embedded therein, said method comprising:

loading the binary mask pixels into a machine having at least one level of Processing Elements forming an array matrix such that each binary mask pixel is stored in a memory in one Processing Element;

forming a gated connection network of Processing Elements for each object in the array by comparing the value of the binary mask pixels stored in each Processing Element with the value of the binary mask pixels stored in its neighboring Processing Elements and closing the gates between Processing Elements that contain the same pixel value and opening the gates between Processing Elements that contain different pixel values;

then, executing a sequence of processing steps on the array matrix to form region increasing in two dimensions, the size, of each region increasing and the total number of region decreasing after execution of each sequence, said sequence comprising:

(a) forming regions of Processing Elements, each region having a plurality of Processing Elements connected so as to be capable of communicating with each other;

(b) determining, for each gated connection network of Processing Elements in each of said regions, the Processing Element which is at a coordinate minimum of the array matrix in that region and assigning an unique source label to said Processing Element;

(c) determining for each gated connection network of Processing Elements in each of said regions, the Processing Element which is at a coordinate maximum of the array matrix in that region and assigning an unique destination label to said Processing Element;

(d) transferring to and combining in a preselected manner the contents of the object pixels associated with the Processing Element assigned the source label with the contents of the object pixels associated with the Processing Element assigned the destination label;

(e) removing the binary mask pixel stored in the Processing Element assigned the source label from any further minimum or maximum coordinate determination so that said Processing Element is removed from any further minimum or maximum coordinate determination; and (f) repeating steps (a) through (e) to form regions in a second dimension, and (g) repeating steps (a) through (f) until no further transferral and combination as in step (d) is possible since all available Processing Elements assigned the source label have been removed from further minimum or maximum coordinate determination.

2. The method of claim 1 wherein the step of forming said gated connection network of Processing Elements comprises:

forming by physical connection said gated connection network of Processing Elements for each object in the array by comparing the value of the binary mask pixels stored in each Processing Element with the value of the binary mask pixels stored in its neighboring Processing Elements and physically closing the gates between Processing Elements that contain the same pixel value and physically opening the gates between Processing Elements that contain different pixel values.

3. The method of claim 1 wherein the step of forming said gated connection network comprises:

forming by logical connection said gated connection network of Processing Elements for each object in the array by comparing the value of the binary mask pixels stored in each Processing Element with the value of the binary mask pixels stored in its neighboring Processing Elements and logically closing the gates between Processing Elements that contain the same pixel value and logically opening the gates between Processing Elements that contain different pixel values.

4. The method of claim 1 wherein the sequence of steps (a) through (f) is repeated as in step (g) until no further transferral is possible and the regions equal the size of the array matrix.

5. The method of claim 1 wherein each execution of the sequence of steps (a) through (e) results in an increase in size of each region by a power of two over the size of each region resulting after the preceding execution of the sequence in one dimension of the array.

6. The method of claim 1 wherein each execution of the sequence of steps (a) through (e) results in an increase in size of each region by an integral power over the size of each region resulting after the preceding execution of the sequence in one dimension of the array.

* * * * *